UNITED STATES PATENT OFFICE.

HENRY DREYFUS, OF BASEL, SWITZERLAND.

MANUFACTURE OF UNINFLAMMABLE CELLULOID.

1,325,931.  Specification of Letters Patent.  Patented Dec. 23, 1919.

No Drawing.  Application filed February 15, 1918. Serial No. 217,378.

*To all whom it may concern:*

Be it known that I, HENRY DREYFUS, of Basel, Switzerland, a citizen of the Republic of Switzerland, have invented certain new and useful Improvements in the Manufacture of Uninflammable Celluloid, of which the following is a specification.

This invention has reference to the manufacture of uninflammable celluloid having a basis of acetate of cellulose, including in this designation, films or other articles of manufacture composed of such celluloid.

In the specification of my United States Patent 1,217,722 and Reissued Patent No. 14,338, and of my applications for United State Patents Serial No. 25,820, filed May, 4, 1915, Serial No. 103,862, filed June 15, 1916, Serial No. 52,297, filed September 23, 1915, and Serial No. 73,496, filed January 21st, 1916, I have described processes for the manufacture of acetate of cellulose having in their clear solutions, for example by way of comparison, in acetone, very high viscosity. These processes allow of regulating the viscosity as desired, by making gradations of changes during the production of the acetate.

Thus viscosities can be produced varying from about 12 to 20, 30, 40, 50, 100 and even 150 and more (as measured by the Ostwald viscosimeter as used for example in the specification of the British Aeronautical Inspection Directorate), whereas with the other known processes for the manufacture of cellulose acetate, it is not possible to gradate to these viscosities or even to attain a viscosity of more than about 10. This is due to the fact that in order to obtain a certain viscosity it is necessary to pass through the direct acetylation processes as described in the specifications above indicated which produce, as an intermediate material, by direct acetylation with the acetylating mixture, acetate of cellulose, which, after acetylation and precipitation when the clear solution is obtained, represent products insoluble in chloroform, which may be soluble in addition of more or less alcohol, or other products which do not dissolve even on addition of alcohol.

But, be it understood, according to the gradations or small changes of procedure that are applied for these products in a second process which has nothing to do with acetylation, one can (according to the exact procedure followed) either pass through phases in which they become soluble in chloroform and then lose this solubility in succeeding phases in some modifications, whereas in other modifications the said products never become soluble in chloroform.

It is moreover a recognized fact (similarly to what is the case with nitrocellulose) that the more viscous acetates of cellulose are, the better is their quality. A product of low viscosity gives for example celluloid or films which are brittle as compared with those made with a more viscous acetate of cellulose, that is to say the strength of a cellulose acetate of low viscosity is much less than that of an acetate of high viscosity, and one might almost say, up to a certain point, that the strength of the finished products increases with the increase of viscosity.

This is understandable from the fact that the more viscous the product is, the more is the cellulose it contains still intact and not depolymerized, as in a product of more or less low viscosity.

I have found, both for the manufacture of films and for the manufacture of celluloid that in proportion to increase of their viscosity the acetates of cellulose will bear greater and greater quantities of softening or plasticizing agents having high boiling points, without the finished products becoming too supple or becoming oily from the excess of the softening substances. These cellulose acetate products having a larger content of softening agents acquire more strength from every point of view.

Thus for example, and to explain the process, it has been found that to make noninflammable celluloid, using triacetin as softening agent, it is hardly possible, for an acetate of cellulose having a viscosity of about 8 to 12, to employ more than 10 to 15 per cent. of triacetin calculated on the weight of cellulose acetate employed having the said viscosity.

If on the contrary one employs an acetate of cellulose having a viscosity of 35 to 45 one can readily incorporate with it 40 and even 50 per cent. of triacetin calculated on the weight of the cellulose acetate having a viscosity of about 35 to 45, and without the finished product becoming oily or too soft, or sweating with the softening substance.

Evidently if cellulose acetates are employed having still greater viscosities, up to 100 or 150, the quantity of triacetin can be further increased.

Of course triacetin is only given by way of example and any other appropriate softening substances may be employed. Likewise it is to be well understood that one may add thereto triphenyl phosphate or tricresylphosphate, or other substances having the same effects.

Preferably such substances are taken in quantities up to one-fourth or one-fifth of the amount of the softening substances employed.

I may also add filling substances or usual coloring matters, or substances having various effects from the optical or physical point of view, such as metallic powders, luminous or phosphorescent substances and so forth.

The importance of the results obtainable by the present invention can be appreciated if they are compared with those obtainable up to the present in the manufacture of celluloid and films with nitrocellulose as a base.

If, for example, one takes an ordinary nitro-cellulose celluloid, (recognized as the best from all points of view), say a transparent celluloid, and isolates the nitrocellulose therefrom in an appropriate way, its comparative viscosity, ascertained according to the same methods as for acetate of cellulose, is found to be about 45. Likewise for films, it is found that the viscosity of the isolated nitrocellulose is approximately 55.

Thus by my processes above referred to it is easy to attain with acetate of cellulose, the same viscosities as for the best celluloid or the best films, or the best nitrocellulose contained therein heretofore known, in other words, one can obtain at least the same strength from all points of view as for inflammable celluloid or inflammable film, although this has been thought to be impossible. Not only is this result attained, but it is greatly exceeded with acetates of cellulose, manufactured according to my said processes, as with these one can attain much higher viscosities, going to 100 and even 150 and more, while obtaining products which give in acetone, solution, for example of a concentration of 20%, which solutions are as clear as water.

What I claim and desire to secure by Letters Patent is:—

In the manufacture of non-inflammable celluloid masses, the step of adding a plasticizing agent to cellulose acetate, the amount of such plasticizing agent being the greater, the greater the viscosity of the cellulose acetate used.

In testimony whereof I have hereunto subscribed my name.

HENRY DREYFUS